United States Patent [19]
Yamano et al.

[11] 3,973,361
[45] Aug. 10, 1976

[54] STYLUS GRINDING DEVICE FOR VIDEO DISC PLAYER

[75] Inventors: Masaru Yamano; Hironosuke Ikeda, both of Hirakata; Ichiro Takahara, Kadoma; Toshiyuki Kudo, Hirakata; Kazuo Ito, Takarazuka; Makoto Yamada, Katano, all of Japan

[73] Assignee: Sanyo Electric Co., Ltd., Japan

[22] Filed: July 11, 1975

[21] Appl. No.: 595,117

[52] U.S. Cl................................ 51/241 R; 51/281 SF
[51] Int. Cl.² ........................................ B24B 19/16
[58] Field of Search.............. 51/109 R, 125, 125 S, 51/165 R, 165.77, 241 R, 241 G, 209 R, 210, 281 R, 281 SF; 274/38, 45

[56] References Cited
UNITED STATES PATENTS

| | | | |
|---|---|---|---|
| 3,266,196 | 8/1966 | Barcaro | 51/281 R |
| 3,543,447 | 12/1970 | Leibowitz | 51/125 |
| 3,891,222 | 6/1975 | Wimmer | 274/45 X |

*Primary Examiner*—Al Lawrence Smith
*Assistant Examiner*—Nicholas P. Godici
*Attorney, Agent, or Firm*—Armstrong, Nikaido & Wegner

[57] ABSTRACT

A stylus grinding device for use in a video disc player comprises a rotary grinding disc adapted to be rotated at its center during a grinding operation subject to the pickup stylus. The stylus grinding device is designed such that the amount of the pickup stylus to be ground varies depending upon the duration of actual service performed by the pickup stylus to reproduce video information recorded on a flexible foil-type disc record.

6 Claims, 16 Drawing Figures

STYLUS GRINDING DEVICE FOR VIDEO DISC PLAYER

BACKGROUND OF THE INVENTION

The present invention generally relates to a video disc player utilizing a flexible foil-type disc record made of synthetic material such as polyvinyl chloride, which disc record is rotated at its center at a high speed, for example, 1,800 rpm. and, simultaneously with the rotation of the disc record; hovers on a rotation-induced air cushion above a stationary support or table.

More particularly, the present invention pertains to a stylus grinding device for use in the video disc player of the type referred to above, which device is designed such as to grind the stylus of a pickup or transducer mechanism of the video disc player to an optimum shape under a predetermined grinding condition selected in accordance with the duration of actual service of the stylus.

It is well known that the stylus used in the pickup of the video disc player is made of a hard material such as a diamond. However, it has been found and well recognized that even the tip of the diamond stylus tends to wear as it engages under friction in the spiral groove on the recorded disc record while the latter is rotated at the high speed. On the other hand, it is also well known that the video disc record is a high density information storage medium, the pitch between the concave and convex of video signal of which being in the order of a few micrometers and, therefore, the wear of the stylus tip results in voltage reduction of an output signal from the transducer mechanism with consequent reduction in quality, such as drop-out, of the picture reproduced.

Hereinafter, a mechanism of wear of the pickup stylus used in the video disc player will be described in detail with particular reference to FIGS. 1(A) and (B) which aare respective views, on a substantially micrographically enlarged scale, of the pickup stylus engaging in one turn of the spiral groove on the disc record being shown in section as taken in a radial direction thereof and that as taken in a direction parallel to the direction of extension of the spiral groove on the disc record.

As best shown in FIG. 1(B), only a portion 1 of the pickup stylus 1, which is located at a trailing side with respect to the direction of rotation of the disc record 2 as indicated by the arrow, rides over several groove crests 2a simultaneously like a sleigh runner, which crests 2a are formed at the bottom of each turn of the spiral groove in the form of frequency-modulated video information. The hatched area indicated by A in FIG. 1(B) represents a portion of the surface on each side of the pickup stylus 1 which slidingly contacts a corresponding one of the opposed side walls 2c and 2b defining each turn of the spiral groove on the disc record 2.

Figure 1A:
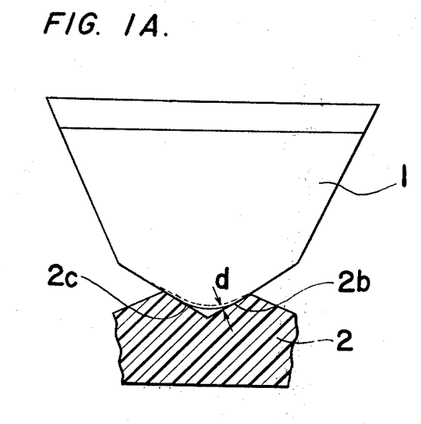
FIG. 1(A) is a sectional view, on a substantially micrographically enlarged scale, of a portion of the video disc record taken in the radial direction to show the pickup stylus engaging in the groove on the video disc record.
Figure 1B:
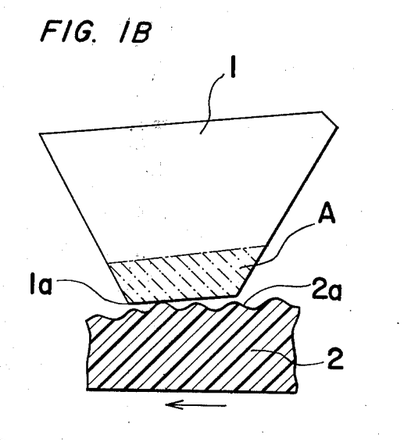
FIG. 1(B) is a sectional view, on a substantially micrographically enlarged scale, of a portion of the video disc record taken in a direction parallel to the direction of extension of the groove on the disc record to show the pickup stylus engaging in the groove on the video disc record.

As best shown in FIG. 1(A), as the duration of actual service of the pickup stylus 1 increases, the stylus tip gradually wears from the original shape, indicated by the real line, to a shape indicated by the broken line.

A cause of the wear of the stylus has been considered as a cumulative effect of carbonization, and consequent softening, of the stylus by the heat generated by the friction of the stylus 1 against the groove crests 2a and walls 2b and 2c, together with change in physical structure, and consequent deterioration, of the material used to form the pickup stylus, which occurs as the pickup stylus 1 is repeatedly used.

In order to ensure, even though the pickup stylus has worn to some extent, a good reproduction of the video information, recorded in the groove on the disc record, through a video display tube provided in the video disc player, or if not provided therein, a video display tube in a television receiver to which the video disc player is electrically coupled, a stylus grinding method has heretofore been proposed whereby the pickup stylus is subjected to a grinder each time one cycle of operation or scan of the pickup stylus relative to the disc record completes, that is, each time the pickup stylus has been used to reproduce the complete video information recorded on one disc record.

Figure 2A:
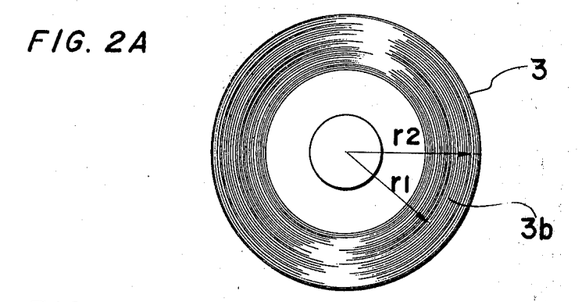
FIG. 2(A) is a schematic top plan view of the grinding disc.
Figure 2B:
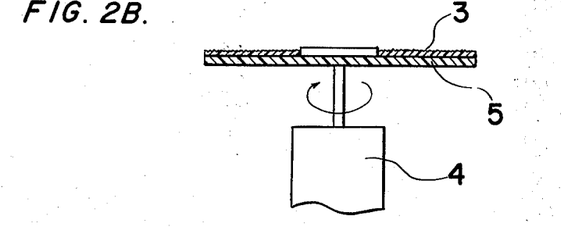
FIG. 2(B) is a schematic side view of the grinder using the grinding disc of FIG. 2(A)

More specifically, as shown in FIGS. 2(A) and (B), according to the heretofore proposed method described above, upon completion of each cycle of scan of the pickup stylus relative to the disc record, the pickup carrying the stylus is moved radially outwards past the outermost one of turns of the spiral groove on the disc record with the stylus clearing of the disc record. A grinding disc 3, which is located outside the outer periphery of the disc record and which is rigidly mounted on a rotary disc 5 coupled to an electric motor 4, is applied to the pickup stylus under a predetermined contact pressure to grind said pickup stylus while said grinding disc 3 is rotated at a high speed, for example, 10,000 rpm.

The grinding disc 3 used in this example is formed by bonding fine particles of diamond, 1 micron in average particle size, over a support sheet 3a, for example, made of polyvinly chloride, and subsequently subjecting to a press work to form a plurality of concentric grooves 3b on the diamond bonded surface of the support sheet 3a, said grooves 3b being best shown in FIG. 2(C) which illustrates, on a substantially micrographically enlarged scale, of some of the concentric grooves 3b in section as viewed in a radial direction of the grinding disc 3. The resultant disc 3 is thereafter mounted on the rotary disc 5 for rotation together with said rotary disc 5.

Figure 3:
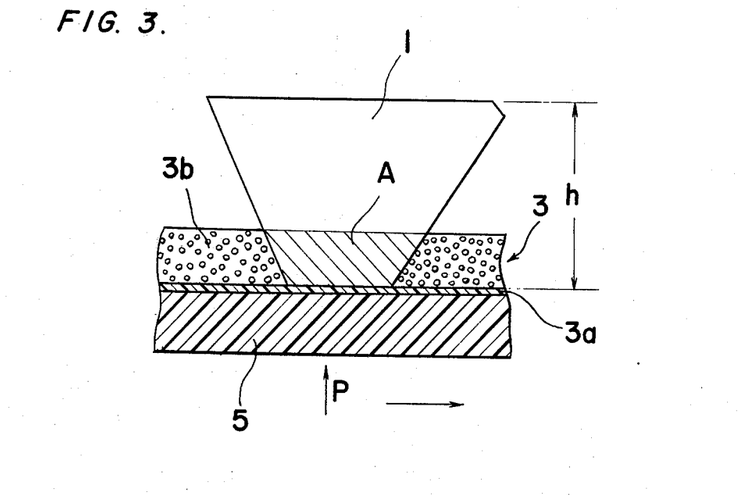
FIG. 3 is a sectional view, on a substantially micrographically enlarged scale, of a portion of the grinding disc taken in a direction parallel to the direction of extension of the grinding groove on the grinding disc, showing a manner of engagement of the stylus tip in the grinding groove.

In practice of the above described method, the pickup stylus 1 is held in contact with the grinding disc 3 under the predetermined contact pressure P while the stylus tip is, as best shown in FIG. 3, slidingly engaged in one of the concentric grooves 3b. Specifically, in the condition of FIG. 3, the opposed side areas at the tip of the pickup stylus 1 are held in sliding contact with respective side walls of the grinding groove 3b on the grinding disc 3 during rotation of the rotary disc 5, and, therefore, the grinding disc 3 in a direction as indicated by the arrow in FIG. 3. As can readily be understood, as the grinding operation proceeds for a substantially long period of time, the height h of the pickup stylus 1 decreases with consequent increase of the surface area A on each side of the pickup stylus 1. Although one cycle of grinding operation usually completes in a few seconds, reduction of the height h of the pickup stylus 1 together with consequent increase of the surface area A steadily occurs with repeated cycles of grinding operation. Increase of the surface area A on each side of the pickup stylus 1 results in reduction of the load received per unit surface area by each of the side areas of the pickup stylus 1 which are respectively in contact with the opposed walls of the grinding groove 3b during the grinding operation.

As regards the friction wear of the trailing portion of the stylus tip, the amount of wear occurring during each cycle of scan of the pickup stylus relative to the disc record can be considered to be constant irrespective of the surface area A which increases with repeated cycles of grinding operation subjected to the pickup stylus, since the contact area of the pickup stylus tip against the groove crests 2a is very small as shown in FIG. 1(B). Accordingly, the amount of the stylus tip to be ground, which is defined by d between the original level of the stylus tip and the ground level of the same stylus tip in FIG. 1(A), may be maintained constant irrespective of increase of the surface area A.

As can be understood from the foregoing discussion, the amount of stress per unit surface area which is applied from the grinding groove 3b to the pickup stylus 1, is smaller when the surface area A is relatively small, that is, at an initial stage of repeated cycles of grinding operation, than when the surface area A is relatively great, that is, at a later stage of the repeated cycles of grinding operation. Therefore, if the pickup stylus is ground under the same condition each time one cycle of scan of the stylus relative to the disc record without the increase of the surface area A being taken into consideration, the amount of the stylus tip to be ground becomes smaller at the later stage of the repeated cycles of grinding operation than at the initial stage of the repeated cycles of grinding operation.

In order to maintain the amount of the pickup stylus to be ground to be constant irrespective of the duration of actual service of the pickup stylus, the grinding condition to which the pickup stylus is subjected should be varied with increase in the duration of actual service of the pickup stylus.

SUMMARY OF THE INVENTION

Accordingly, an essential object of the present invention is to provide an improved stylus grinding device for use in a video disc player utilizing a flexible foil-type disc record adapted to be rotated at its center at a high speed and, at the same time, to hover on a rotation-induced air cushion above a stationary support, which grinding device is capable of varying a grinding condition to be subjected to the pickup stylus with increase of the duration of actual service of the pickup stylus so that the stylus tip can be ground to an optimum shape.

It should be noted that the relative terms duration of actual service hereinbefore and hereinafter used is to be construed as including the cumulative time during which the pickup stylus 1 is actually engaged in the spiral groove on each video disc record to reproduce the video information, which may be one or both of the video and audio signals, recorded on such disc record, and the number of reproduction of the video information on the disc record performed by the pickup stylus.

The grinding condition to which the pickup stylus to be ground is subjected and which varies in accordance with increase of the duration of actual service of the pickup stylus may, according to the present invention, be controlled by varying the length of run of the pickup stylus relative to the grinding disc or by varying the contact pressure between the pickup stylus and the grinding disc. More specifically, control of the grinding condition can be achieved by any of the following methods.

I. Control of the grinding time during which the pickup stylus is actually ground, II. Control of the number of revolution of the grinding disc, III. Control of the position of the pickup stylus relative to the position of a grinding groove on the grinding disc, and IV. Control of the contact pressure between the pickup stylus and the grinding object.

BRIEF DESCRIPTION OF THE DRAWINGS

Other objects and features of the present invention will become apparent from the following description taken in conjunction with preferred embodiments thereof with reference to the accompanying drawings, in which:

FIGS. 1(A) to FIG. 3 having already been referred to in the foregoing description.

DESCRIPTION OF PREFERRED EMBODIMENTS

Before the description of the present invention proceeds, it should be noted that like parts are designated by like reference numerals throughout the accompanying drawings.

Figure 4:
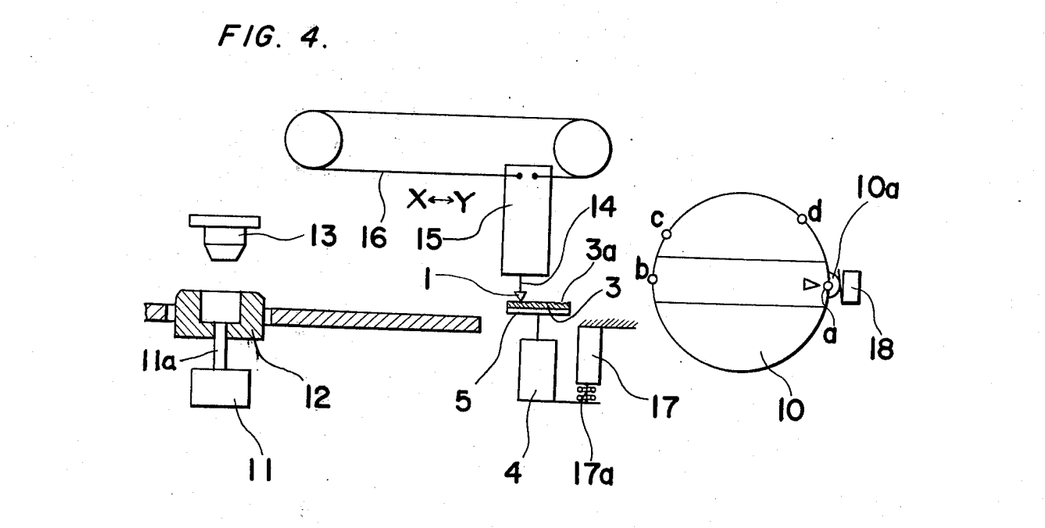
FIG. 4 is a schematic diagram showing a video disc player equipped with a stylus grinding device to which the present invention is applicable, said grinding device being shown as assuming one operative position.
Figure 5:
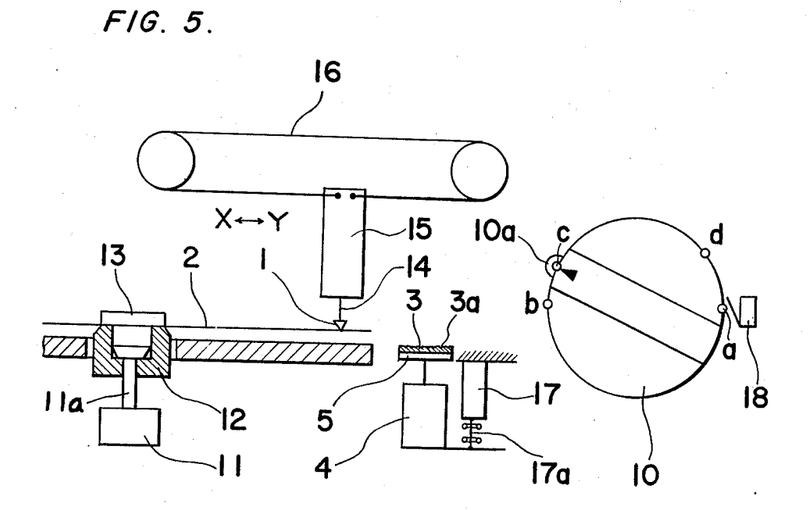
FIG. 5 is a diagram similar to FIG. 4, showing the grinding device in another operative position.

Referring first to FIGS. 4 and 5, the video disc player to which the present invention can be applicable will now be described. It is to be noted that, in FIG. 4, the pickup stylus 1 is shown as being ground while FIG. 5 illustrates that the pickup stylus 1 is in process of reproduction of the video information recorded on the disc record 2 being rotated.

In FIGS. 4 and 5, reference numeral 10 represents a manipulating knob accessible to an operator of the video disc player, which manipulating knob 10 is provided outside a player cabinet (not shown) and is manually reciprocally rotatable to assume any of four operative positions a, b, c and d.

Reference numeral 11 represents an electric motor having a drive shaft 11a which carries a record mount 12 for support of the disc record 2 thereon. The record mount 12 rigidly carried by the drive shaft 11a for rotation together therewith cooperates a releasable clamp member 13 for clamping a central portion of the disc record 2 firmly between the record mount 12 and the clamp member 13 during rotation of the drive shaft 11a to rotate said disc record.

Reference numeral 14 represents a pickup carrying the stylus 1. The pickup 14 is detachably mounted to a pickup carriage 15 which is designed such as to allow the pickup 14 to move in a direction perpendicular to the plane of the disc record 2 being rotated. More specifically, the pickup carriage 15 is operatively associated with a manually manipulatable PLAY button (not shown) in such a manner that, when said PLAY is depressed, the pickup 14 is outwardly projected with the pickup stylus 1 engageable in the spiral groove on the disc record and, so long as the PLAY button is released, the pickup 14 is inwardly retracted with the pickup stylus 1 clear of the spiral groove on the disc record 2. The pickup carriage 15 is connected to a drive cable 16 for movement together with movement of the drive cable 16 in a direction parallel to the plane of the disc record 2. It is to be noted that, when the pickup carriage 15 is to be moved in a direction, indicated by the arrow X, with the pickup stylus 1 moving from the outermost turn of the spiral groove on the disc record 2 towards the innermost turn of the same spiral groove on the disc record 2, the drive cable 16 is operatively associated with the motor 11 through a reduction gear to pull the pickup carriage 15 in such direction X while movement of the pickup carriage 15 in the opposite direction as indicated by the arrow Y can be achieved by manually operating the manipulatable knob 10 in a manner as will be described later. Operation of a clutch (not shown) necessary to connect and disconnect the motor 11 to and from the drive cable 16 to move the carriage 15 in the manner described above can be controlled by said PLAY button.

Reference numeral 3 represents a grinding disc having one surface formed with a plurality of concentric grinding grooves 3a for grinding the pickup stylus 1 when the latter is engaged in any of said grinding grooves 3a. The grinding disc 3 is rigidly mounted on the rotary disc 5 adapted to be driven by an electric motor 4 which is preferably operated when a solenoid as will be described later is energized. Alternatively, the motor 4 may be operated so long as the video disc player is ready to operate. Instead of the employment of the motor 4, the motor 11 may operatively coupled to the rotary disc 5 through a suitable power transmission system designed such as to permit the rotary disc 5 to be rotated at a high speed, for example, 10,000 rpm.

Reference numeral 17 represents a solenoid unit having a solenoid armature 17a operatively associated with the grinder in such a manner that, when the solenoid armature 17a is inwardly retracted with respect to the solenoid unit 17, the grinding disc 3 is upwardly shifted to assume an operative position in readiness for the grinding operation subject to the pickup stylus 1 and, so long as the solenoid armature 17a is outwardly projected with respect to the solenoid unit 17, the grinding disc 3 is held in an inoperative position away from the stylus 1.

Reference numeral 18 represents a normally closed switch, operation of which is controlled by a projection 10a, formed in and outwardly projecting from the periphery of the manipulatable knob 10, in such a manner that, only when the manipulatable knob 10 assumes the position a as shown in FIG. 4, said switch 18 can be opened.

Although the details of cooperative relationships among these components of the illustrated video disc player are herein omitted, the arrangement should be understood as designed so as to operate in the following manner.

During manual rotation of the manipulatable knob 10 from the position a towards the position b in a clockwise direction, the video disc 2 is drawn out of an envelope, set to the video disc player, and is subsequently fed to the record mount 12. Simultaneously therewith, the clamp member 13 is lowered in response to the rotation of the manipulatable knob 10 and, at the time the manipulatable knob 10 arrives at the position b, the disc record 2 is held above the record mount 12 in alignment with the drive shaft 11a while sandwiched firmly between the clamp member 13 and said record mount 12.

Subsequent rotation of the manipulatable knob 10 from the position b towards the position c in the clockwise direction causes the pickup stylus 1, which has been positioned immediately above the grinding disc 3, to be brought to the operative position in readiness for engagement into the outermost turn of the spiral groove on the disc record 2. After the manipulatable knob 10 has arrived at the position c, the PLAY button (not shown) is depressed to cause the pickup 14 to be lowered so that the pickup stylus 1 can be engaged in the outermost turn of the spiral groove on the disc record 2 and, simultaneously therewith, to cause the motor 11 to be operated. (Alternatively, the motor 11 may be operated at the time the disc record, fed from the envelope, has already been held above the record mount 12 and firmly sandwiched between said record mount 12 and the clamp member 13.)

As a result thereof, the pickup carriage 15 is moved in the direction X with the pickup stylus 1 scanning the disc record from the outermost turn of the spiral groove towards the innermost turn of said spiral groove so that the video information recorded in the spiral groove on the disc record 2 can be picked up and reproduced through the video display tube. During the movement of the carriage 15 in the direction X, the manipulatable knob 10 rotates from the position c towards the position d in the clockwise direction and arrives at the position d at the time reproduction of the complete video information completes, that is, at the time the pickup stylus 1 arrives at the innermost turn of the spiral groove on the disc record.

When the manipulatable knob 10 arrives at the position d, the PLAY button (not shown) which has been held in the depressed position can be released to the original position, and at the same time, the pickup stylus can be upwardly lifted clear of the video disc. Substantially simultaneous release of the PLAY button and upward lift of the pickup stylus can be achieved by controlling a switch (not shown) provided in the video disc player in a known manner.

It is to be noted that, where the reproduction of the video information is desired to be interrupted, the pickup stylus can be upwaradly lifted clear of the video disc only by actuating a STOP button (not shown) provided in the player in a known manner.

If the reproduction of the same video information is desired to be repeated once more, what is necessary is to turn the manipulatable knob 10 in the opposite direction, i.e., counterclockwise, from the position d to the position c and then to depress the "PLAY" button again.

On the other hand, if the manipulatable knob 10, which has been held at the position d, is turned from the position d to the position b past the position c, the pickup carriage 15 can be returned to the original position with the pickup stylus 1 situated immediately above the grinding disc 3. Further rotation of the manipulatable knob 10 from the position b to the position a results in separation of the clamp member 13 away from the record mount 12 and, simultaneously therewith, return of the disc record 2 back to the envelope.

For measuring the duration of actual service performed by the pickup stylus relative to one or more video disc records, the following three methods are possible.

i. To integrator the individual times during which the pickup stylus is in contact with the disc record or disc records, for example, the PLAY button is repeatedly depressed, ii. To measure the number of repetition of video information reproduction performed by the pickup stylus, for example, the number of repetition of return of the pickup to the original position immediately above the grinding disc, and subsequently to store in an integrated form electric potential corresponding to the number of such repetition of such return of the pickup stylus, and iii. To mechanically vary the relative position between the pickup stylus and the grinding disc each time the pickup is returned to the original position or after the number of repetition of a return of the pickup to the original position has attained a predetermined value.

Figure 6:
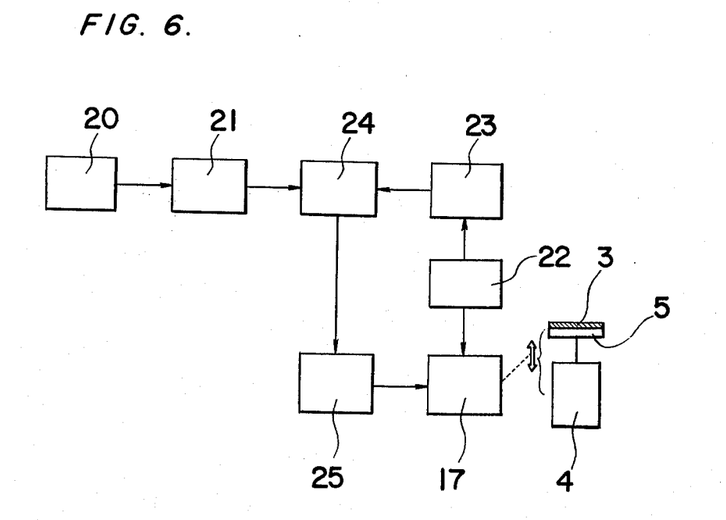
FIG. 6 is a block circuit diagram according to a first preferred embodiment of the present invention, the circuit of FIG. 6 being utilized to control the grinding time.

In FIG. 6, there is shown an electric block diagram of an electric control for controlling operation of the grinder according to the method (i) described above so that the time during which the pickup stylus is subjected to the grinding operation can be controlled.

Referring now to FIG. 6, a block 20 represents means for detecting the duration of actual service of the pickup stylus 1 in terms of the time during which the pick-up stylus relatively scans the video disc record being rotated. A block 21 represents means for converting into an electric potential the time during which the pickup stylus 1 has scanned relative to the video disc record, and subsequently storing said electric potential. A block 22 represents a trigger means designed such as to cause a charging circuit 23 to start its charging operation on one hand and, on the other hand, to cause the solenoid unit 17 to be energized so that the grinding disc 3 can be applied to the pickup stylus 1. A block 24 represents means for comparing the electric potential, fed from the block 21, with the electric potential charged on the charging circuit 23. A block 25 represents switching means for deenergizing the solenoid unit 17 when the electric potential fed from the block 21 to the comparing means 24 becomes equal to the electric potential charged on the charging circuit 23.

Figure 7:
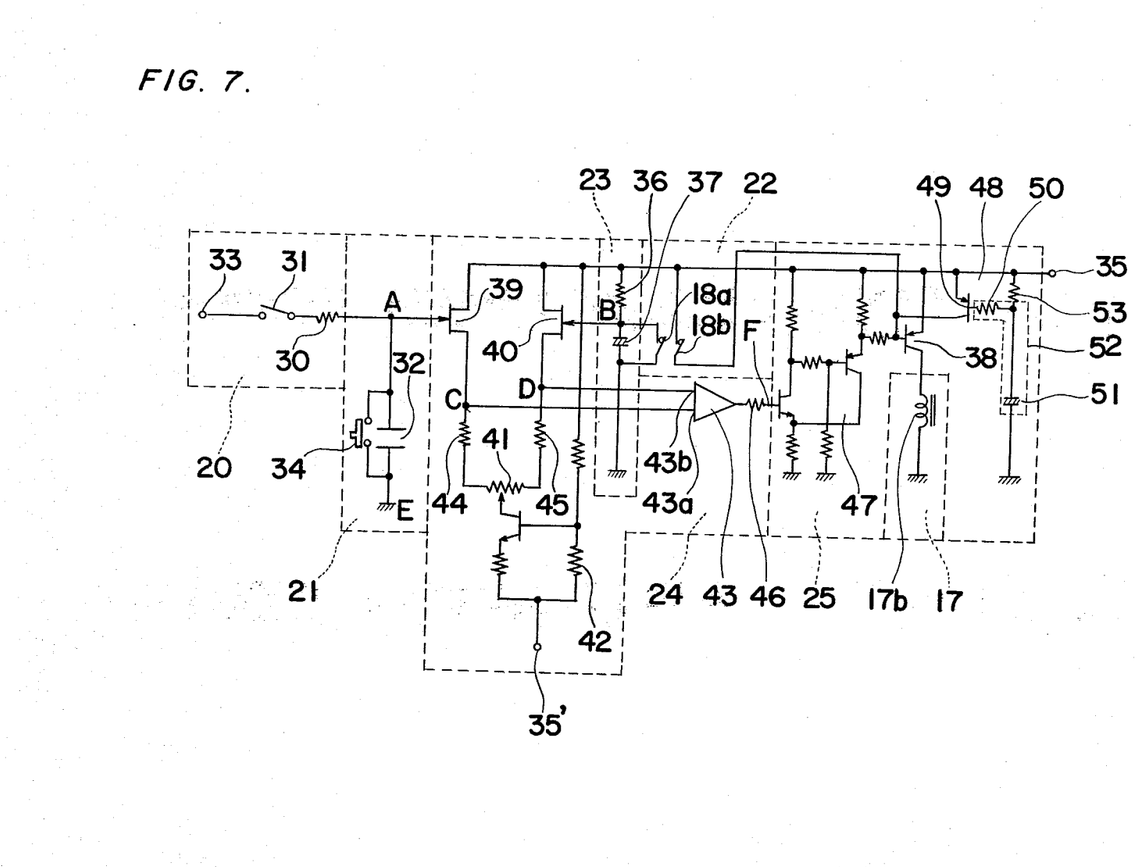
FIG. 7 is an electric circuit diagram showing the details of FIG. 6.

The details of each of the blocks shown in FIG. 6 are illustrated in the circuit diagram of FIG. 7 and, therefore, reference will now be made to FIG. 7.

A switch 31, which forms the detecting means 20 together with a resistor 30 and which has a fixed contact connected to an electric power source through a terminal 33 and a movable contact connected in series with said resistor 30, is normally opened, but is closed only when the pickup stylus 1 is slidingly engaged in the spiral groove on a video disc record.

Figure 8:
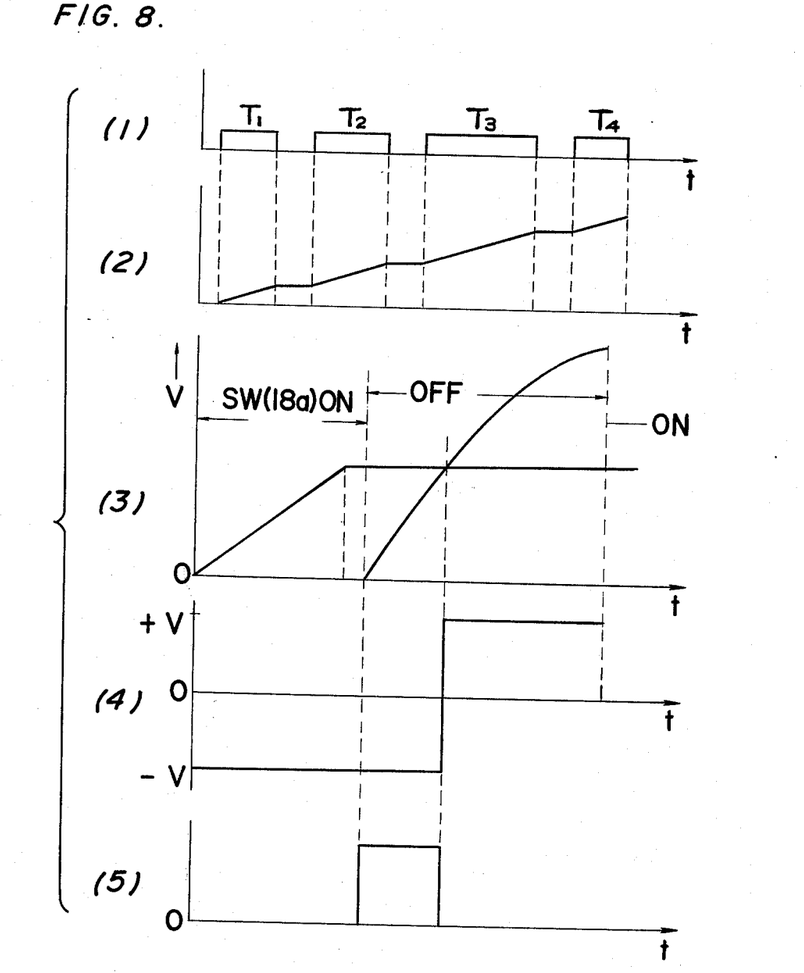
FIG. 8 illustrates various waveforms of electric signals emerging from some of the components of the circuit of FIGS. 6 and 7.

It is assumed that the pickup stylus is actually used several times so that the duration of actual service of the pickup stylus 1 may be equal to the sum of lengths of time respectively indicated by $T_1$, $T_2$, $T_3$ and $T_4$ in a graph (1) of FIG. 8.

The storing means 21 comprises an electrochemical potential memory device 32 electrically connected between a junction A and the ground E of reference potential. This electrochemical potential memory device 32 is designed such as to cumulatively store electric potentials from the power source through the terminal 33 each time the switch 31 is closed, substantially in such a manner as shown in a graph (2) of FIG. 8. During the opening of the switch 31, the electrochemical potential memory device 32 merely holds the electric potential which has been appled thereto from the power source during previous closure of the switch 31. It will readily be seen that this electrochemical potential memory device 32 gives an output signal indicative of the integrated value of potentials applied thereto, which integrated value in turn represents the duration of actual service performed by the pickup stylus.

The details of structure and operation of the electrochemical potential memory device 32 referred to above are disclosed Aug. the U.S. Pat. No. 3,753,110, patented on AUG. 14, 1973 and assigned to the same assignee of the present application, and are therefore herein omitted for the sake of brevity.

Electrically connected in parallel to the memory device 32 is a reset switch 34 for, when closed, resetting the stored potential on the memory device 32. This switch 34 is preferably operatively associated with the pickup 14 in such a manner that, only when the pickup 14 with the pickup stylus 1 carried thereby is to be replaced by a new pickup and, therefore, removed from the carriage 15, the switch 34 can be closed.

The charging circuit 23 comprises a resistor 36 and a capacitor 37 connected in series therewith, A series circuit composed of the resistor 36 and the capacitor 37 is inserted between a terminal 35 and the ground E, which terminal 35 is in turn connected to a power source. In order to increase the grinding time in proportion to the increase of the duration of actual service of the pickup stylus, it is preferable to utilize an area where increase of the potential at a junction B, that is, increase of the potential charged on the capacitor 37, exhibits a linear characteristic. However, in the case where a relationship different from the aforesaid proportional relationship between the increase of the grinding time and that of the duration of actual service of the pickup stylus is found depending upon a characteristic of the stylus used, the charging circuit may be designed such as to exhibit a charging characteristic necessary to accommodate such different relationship.

It should be noted that the charging time constant of the charging circuit 23 may be selected so as to correspond the grinding time required for the pickup stylus, which has been worn to a critical value at which the pickup stylus will no longer be used, to be ground to an optimum condition, for example, about 10 seconds.

The trigger means 22 includes first and second switches 18a and 18b both adapted to be turned off only when the manipulatable knob 10 is held at the position a. The first switch 18a is connected in parallel to the capacitor 37 on one hand and, on the other hand, the second switch 18b is connected between the terminal 35 and, therefore, the power source and the base of a switching transistor 38, which transistor 38 has a collector electrically connected to a solenoid coil 17b of the solenoid unit 17.

Accordingly, as shown in a graph (3) of FIG. 8 (It should be noted that the time base in the graph (3) of FIG. 8 is shown on an enlarged scale as compared with that in the graphs (1) and (2). This is equally true of graphs (4) and (5) which will be referred to later.), the charging circuit 23 starts charging in response to switching off of the switch 18a and continues charging during each opening of the switch 18a for a period of time determined by the time constant of the charging circuit 23. After the period of time determined by the time constant of the charging circuit 23 and upon closure of the switch 18a, the potential stored on the charging circuit 23 becomes discharged.

On the other hand, since the switching transistor 38 is of a type which is biased to conduct when the second swtich 18b is turned off, the solenoid unit 17 can be energized upon return of the manipulatable knob 10 to the position a, as shown in a graph (5) of FIG. 8.

From the foregoing, it is clear that the trigger means 22 acts to control the time at which the charging circuit 23 starts charging and, on the other hand, to control the time at which the solenoid unit 17 is energized.

The comparing means 24 may be employed in the form of any known comparator and includes a first field effect transistor 39 to which the electric potential at the junction A, that is, the electric potential stored on the memory device 32, is applied, a second field effect transistor 40 to which the electrical potential at the junction B, that is, the electrical potential stored on the capacitor 37, is applied, a variable resistor 41 for adjusting the balance between the respective gains of the first and second field effect transistors 39 and 40, and an operational amplifier 43. The operational amplifier 43 has an inverting input 43a adapted to receive an output from the first field effect transistor 39, that is, an electric potential at a junction C, and a non-inverting input 43b adapted to receive an output from the second field effect transistor 40, that is, an electric potential at a junction D.

The comparing means 24 is designed such that, when the electric potential at the junction A is higher than that at the junction B, that is, when the electric potential at the junction C is higher than that at the junction D, the output potential from the operational amplifier 43, that is, the electric potential at a junction F, represents a negative characteristic while, when the potential applied to the non-inverting input 43b is higher than that applied to the inverting input 43a, the potential at the junction F represents a positive characteristic, substantially as shown in a graph (4) of FIG. 8.

Although whether the output from the operational amplifier 43 is positive voltage or whether the same is negative voltage depends upon the type of the operational amplifier used, the ouput from the operational amplifier 43 can be obtained in the form of voltage of a value substantially equal to or approximating to the electric potential at the terminal 35 or 35' and, therefore, the power source voltage applied to the terminal 35 or 35'.

The comparing means 22 further includes resistors 44 and 45 respectively connected between one end of the variable resistor 41 and the source of the first field effect transistor 39 and between the other end of the variable resistor 41 and the source of the second field effect transistor 40, and a resistor 46 for protecting the operational amplifier 43 when the output from said amplifier 43 is shortcircuited.

The switching means 25 comprises a known Schmidt trigger circuit 47 and the switching transistor 38 described above and is designed such as to cause the switching transistor 38 to conduct when the output from the operational amplifier 43 is negative and, in other words, when the electric potential stored on the memory device 32 is higher than that stored on the capacitor 37. It will readily be seen that, during conduction of the switching transistor 38 and simultaneous opening of the first and second switches 18a and 18b, the solenoid coil 17a of the solenoid unit 17 can be energized so that the grinding disc 3 can be moved from the inoperative position to the operative position to grind the pickup stylus. On the other hand, when the output from the operational amplifier 43 becomes positive, the Schmidt trigger circuit 47 is inverted to cause the switching transistor 38 to be non-conductive substantially as shown in the graph (5) of FIG. 8.

In summary, the switching means 25 is such as to deenergize the solenoid coil 17a, which has been energized, when the comparing means 24 generates an output signal indicative of equalization of the electric potentials, respectively stored on the memory device 32 and the capacitor 37, to each other.

With the above construction, the system operates in a manner as will now be described.

So long as the video disc player is operated, the switch 31 is closed and, therefore, the electrical potential from the power source through the terminal 33 is applied through the switch 31 to the memory device 32 and stored in said memory device 32. The amount of electric potential stored in the memory device 32 corresponds to the time during which the pickup stylus is actually used to reproduce the video information on the disc record 2.

Upon completion of one cycle of reproduction of the video information by the video disc player, the switch 31 becomes turned off and, therefore, the memory device 32 ceases to undergo the charging operation. If the manipulatable knob 10 is subsequently turned from the position d to the position b past the position c, the pickup stylus 1 can be brought to the position immediately above the grinding disc 3. Further rotation of the manipulatable knob 10 from the position b to the position a results in return of the disc record 2 from a position above the record mount 12 back to the envelope and, simultaneously therewith, opening of the first and second switches 18a and 18b. Upon opening of the first and second switches 18a and 18b forming the trigger means, not only the solenoid coil 17a becomes energized, but also the charging circuit 23 starts charging. When the electric potential stored on the charging circuit 23 becomes equal to the electric potential stored on the memory device 32, the comparator 24 generates an output signal to the switching means 25 to control the latter so that the control of the solenoid coil 17a can be released.

From the foregoing, it is clear that, since the solenoid coil 17a is controlled for a period of time associated with the duration of actual service of the pickup stylus 1, the pickup stylus can be ground by the grinding disc 3 for such a period of time.

In the arrangement so far described, there will be a possibility that the pickup stylus, which has already been ground, may again be ground when a main switch provided between the video disc player circuitry and the power source is switched off and on. More specifically, the grinding operation completes in a few seconds after the manipulatable knob 10 has been turned to the original position a. Assuming that, after this grinding operation has completed, the main switch provided between the video disc player circuitry and the power source is turned off, the potential stored on the capacitor 37 will be discharged. Subsequent switching on of the main switch may result in that the pickup stylus, which has just been ground, is again subjected to the next grinding operation.

In order to completely avoid the foregoing possibility, there is provided a delay circuit 48 which comprises a transistor 49 disposed in position to shortcircuit between the base and emitter of the switching transistor 38, and a time constant circuit 52 including a resistor 50 and a capacitor 51 connected in series with said resistor 50. If the time constant of the circuit 52 is selected to be greater than that of the charging circuit 23, for example, more than 10 seconds, the foregoing possibility can completely be avoided. It is to be noted that a resistor 53 is provided for temperature compensation.

Figure 9:
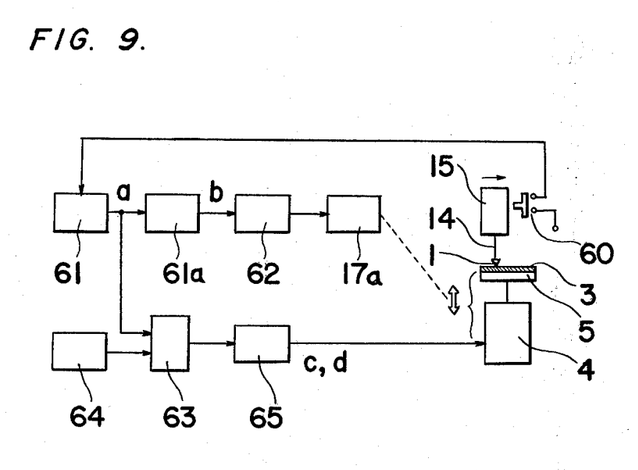
FIG. 9 is a block circuit diagram according to a second preferred embodiment of the present invention, the circuit of FIG. 9 being utilized to control the number of revolution of a grinding disc.

The electric control for controlling operation of the grinder according to the method (ii) described above so that the number of revolution of the grinding disc 2 can be controlled in accordance with the duration of actual service of the pickup stylus, is illustrated in FIG. 9 as a second preferred form of embodiment of the present invention.

Referring now to FIG. 9, there is employed a switch 60 adapted to be closed in response to return of the carriage 15 to the original position with the pickup stylus situated immediately above the grinding disc 3 and each time said pickup carriage 15 is returned back to the original position. The number of repeated closure of the switch 60 and, therefore, the number of repetition of reproduction of the video information on the disc record 2, can be counted by a counting circuit 61 which, when said number of repeated closure of the switch 60 counted by said counting circuit 61 attains a predetermined value which may be one or more, generates a gating pulse of a predetermined pulse width to a monostable multi-vibrator 61a and also to a gating circuit 63. The monostable multi-vibrator 61a upon receipt of the gating pulse from the counting circuit 61 generates a control signal, of a waveform as shown by (b) in FIG. 10, necessary to energize the solenoid coil 17a for a predetermined time. Electrically connected between the multi-vibrator 61a and the solenoid coil 17a is a drive circuit 62 for the solenoid unit 17. Accordingly, it will be seen that the solenoid coil 17a can be energized for a period of time substantially equal to the duration of the control signal generated by the monostable multi-vibrator 61a. As hereinbefore described, during the energization of the solenoid coil 17a, the grinder is upwardly shifted with the grinding disc 2 relatively engaging the pickup stylus 1 to grind the latter.

Figure 10:
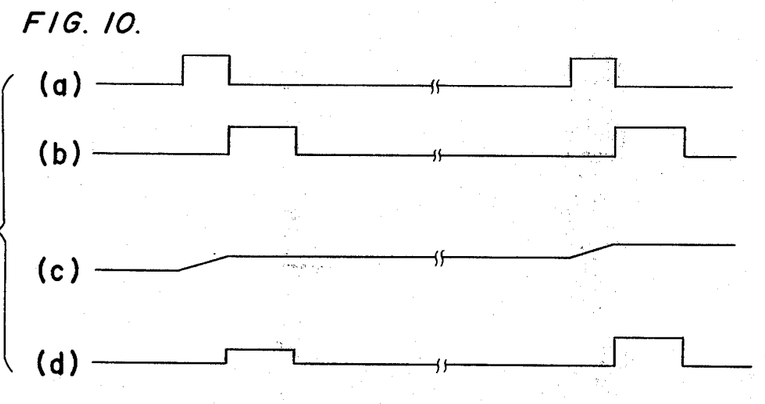
FIG. 10 illustrates various waveforms of electric signals emerging from some of the components of the circuit of FIG. 9.

The gating pulse from the counting circuit 61 is also applied to the gating circuit 63 to control the latter so that supply of an electrical potential from a D.C. power source 64 to the electrochemical potential memory device 65 through the gating circuit 63 can be controlled. In other words, the memory device 65 is operated by the gating pulse from the counting circuit 61 so as to integrate successively electric potentials of a predetermined value in a manner as shown by (c) in FIG. 10. An output from the memory device 65 indicative of the electric potential stored on the memory device 65, the wave form of which is illustrated by (d) in FIG. 10, is applied to the motor 4 so that the number of revolution of the motor deive shaft of the motor 4 can be controlled in accordance with the duration of actual service of the pickup stylus.

Figure 11:
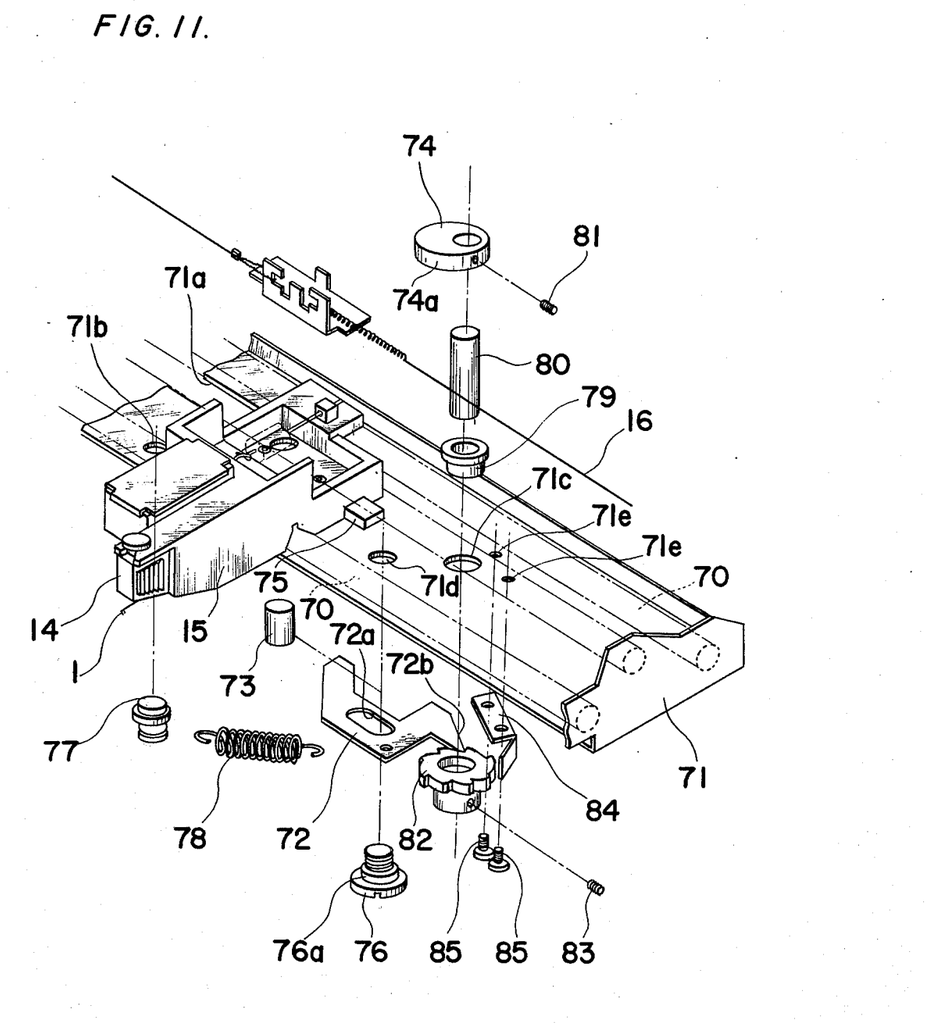
FIG. 11 is an exploded view of a stylus positioning mechanism according to a third preferred embodiment of the present invention, which stylus positioning mechanism is utilized to control the position of the pickup stylus relative to the grinding disc.
Figure 12:
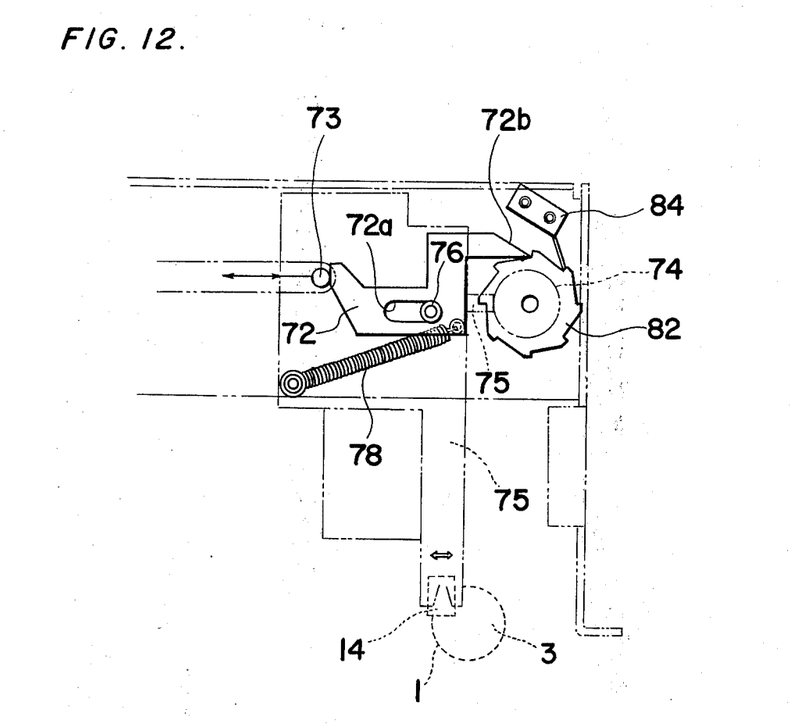
FIG. 12 is a top plan view of an essential portion of the stylus positioning mechanism of FIG. 11.

FIGS. 11 and 12 illustrate a pickup positioning mechanism according to a further preferred embodiment of the present invention, which positioning mechanism is designed such as to subject the pickup stylus to the grinding operation according to the method (iii) described above.

As hereinbefore described with reference to FIGS. 4 and 5, the pickup carriage 15 can be reciprocally moved together with the drive cable 16. During this movement, the carriage 15 is guided along a plurality of parallel guide tracks 70 which are supported in position by a mounting frame 71. The mounting frame 71 is formed therein with a guide slot 71a, extending in a lengthwise direction of said mounting frame or the guide tracks, a bearing hole 71b for a set pin, a bearing hole 71c for a shaft and threaded holes 71d and 71e. On the other hand, the pickup carriage 15 is provided with a control pin 73 for engagement in said guide slot 71a, said control pin 73 being adapted to control a slide plate 72 as will be described later, and an engagement 75 engageable with an eccentric cam 74 as will be described later.

The slide plate 72 is formed therein with an elongated slot 72a extending in a direction parallel to the direction of movement of said slide plate 72 and is slidably secured to the mounting frame 71 by means of a mounting screw 76 screwed into said threaded hole 71d, said mounting screw 76 having a non-threaded or shaft portion 76a which relatively loosely extends through the slot 72a in said slide plate 72. This slide plate 72 so mounted to the frame 71 is normally biased in one direction towards the set pin 77, engaged in said bearing hole 71b, by means of a spring element 78, for example, a tension spring, suspended between said slide plate 72 and said set pin 77.

The eccentric cam 74 is rigidly mounted on an upper end of the shaft 80 by means of a set screw 81, said shaft 80 rotatably extending through a bearing member 79 received in the bearing hole 71c, while the peripheral face 74a of said eccentric cam 74 is held in position ready to engage with the engagement 75 carried by the pickup carriage 15. The shaft 80 has a lower end provided with a ratchet wheel 82 rigidly secured thereto by means of a set screw 83, stepwise rotation of said ratchet wheel 82 being controlled by a pawl 72b which is integrally formed with the slide plate 72. It will readily be seen that the stepwise rotation of the ratchet wheel 82 is transmitted to the eccentric cam 74 through the shaft 80, causing said cam 74 to eccentrically rotate. For avoiding arbitrary rotation of the ratchet wheel 82 which may otherwise take place during disengagement of the pawl 72b of the slide plate 72 from the ratchet wheel 82, a detent member in the form of a leaf spring is provided as at 84. This detent member 84 is secured to the mounting frame 71 by means of a set screw 85 tapped into the threaded hole 71e.

The positioning mechanism of the construction described above operates in the following manner. Assuming that the pickup carriage 15 is returned to the position where the pickup stylus 1 is located immediately above the grinding disc 3, the control pin 73 in the pickup carriage 15 engages against the slide plate 72, thereby causing the slide plate 72 to move against the spring element 78 in a direction with the pawl 72b stepwisely rotating the ratchet wheel 82. In the illustrated embodiment, since the ratchet wheel 82 is shown as having eight gear teeth, one stepwise rotation of said ratchet wheel 82 results in rotation of the shaft 80 through 45°. Because the position of the carriage 15 relative to the eccentric cam 74 varies as the eccentric cam 74 is stepwisely rotated in response to each return of the carriage 15 to the original position, the position of the pickup stylus 1 relative to the position of the grinding grooves on the grinding disc 3 varies. More specifically, with reference to FIG. 2(A), the pickup positioning mechanism shown in FIGS. 11 and 12 are designed such that, while the pickup stylus 1 has been ground engaging in the innermost groove on the grinding disc 3 at the initial stage, the pickup stylus 1 can be ground engaging in the outermost groove on the same grinding disc 3 at the final stage.

Although the foregoing positioning mechanism is constructed such as to vary the position of the carriage 15 relative to the eccentric cam 74, it may alternatively be constructed such as to vary the position of the grinding disc 3 relative to the pickup stylus with the carriage 15 held in the original position. For this purpose, it can be considered to provide that eccentric rotation of the cam 74 causes the grinder to move relative to the carriage 15 in the original position in response to each return movement of said carriage 15.

Instead of the illustrated arrangement wherein the pickup stylus is ground each time the carriage 15 returns to the original position, the positioning mechanism may be designed such as to subject the pickup stylus to the grinding operation in response to a predetermined cycle of repeated return movement of the carriage 15 to the original position. In order to achieve this, the positioning mechanism may be adapted to be controlled by means for counting the number of repeated return of the carriage 15 to the original position so that, only when the number of repeated return of the carriage 15 to the original position attains a predetermined value, the stepwise rotation of the ratchet wheel 82 can be controlled.

Figure 13:
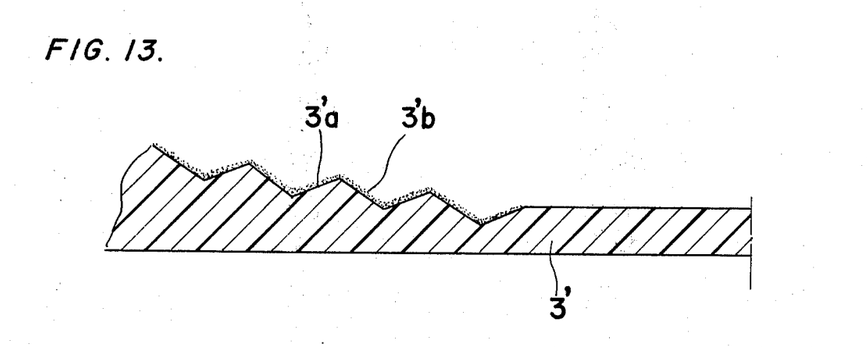
FIG. 13 is a sectional view of the grinding disc taken in a radial direction thereof, which grinding disc is, according to a fourth preferred embodiment of the present, designed so as to control the contact pressure between the stylus tip and the grinding disc.

In the embodiment shown in FIG. 13, there is shown an arrangement to control the contact pressure between the pickup stylus and the grinding disc in accordance with the duration of actual service of the pickup stylus.

Referring now to FIG. 13, the grinding disc 3' is shown as having a different thickness gradually increasing in a radially outward direction from the center thereof. More specifically, one of the opposed surfaces of the grinding disc 3', where substantially concentric grinding grooves 3'a are formed after a layer of diamond particles, designated by 3'b, has been bonded thereto, is upwardly inclined in the radially outward direction thereof so that the thickness os said grinding disc 3' increases from a portion adjacent the center thereof towards the outer periphery thereof.

Figure 2C:
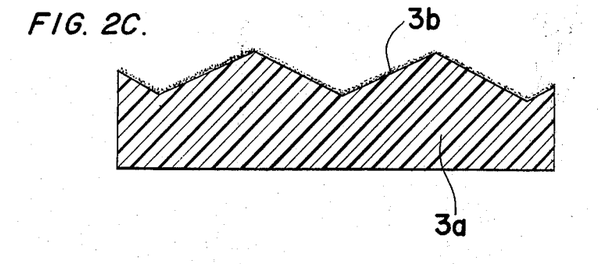
FIG. 2(C) is a sectional view, on a substantially micrographically enlarged scale, of a portion of the grinding disc taken in a radial direction thereof to show the details of the grinding groove.

If this grinding disc 3' is replaced by the grinding disc 3 shown in FIGS. 2(A) to (C), it will readily be seen that, if the pickup stylus 1 is successively engaged to the grinding disc 3' in the order from innermost grinding groove to the outermost grinding groove, the contact pressure between the pickup stylus and any of the grinding grooves and, hence, the grinding disc can be varied. In practice, the position of the pickup stylus 1 relative to any of the grinding grooves may be varied each time the carriage 15 has been returned to the original position or each time the number of return of the carriage 15 has attained a predetermined value.

It should be noted that, by the terms "substantially concentrical" referred to above, it is intended to means not only the grooves 3'a are arranged in concentrical relation to each other, but also that the grooves 3'a are defined by turns of a single spiral grinding groove, which turns are so spaced an extremely small distance from each other that the turns of the spiral groove can apparently be viewed as if they are in concentrical relation to each other.

In the case where the grinder employs the grinding disc 3 shown in FIGS. 2(A) to (B), an alternative method of controlling the contact pressure between the pickup stylus and the grinding disc 3 can be carried out by varying the upwardly shifted position of the grinder relative to the carriage 15. More specifically, the grinder may be designed such as to upwardly shift with increase of the duration of actual service of the pickup stylus.

Although the present invention has been fully described in conjunction with the preferred embodiments thereof, it should be noted that various changes and modifications are apparent to those skilled in the art. By way of example, the method of measuring the duration of actual service of the pickup stylus and the grinding condition may be combined in any suitable or desired manner other than that described in connection with each of the preferred embodiments of the present invention. Moreover, a combination of some of the embodiments described above is also possible. For example, the positioning mechanism of FIGS. 11 and 12 may be combined with the grinding disc of FIG. 13.

Therefore, unless these changes and modifications depart from the true scope of the present invention, they should be construed as included therein.

What is claimed is:

1. A stylus grinding device for use in a video disc player utilizing a flexible foil-type disc record adapted to be rotated at its center at a high speed while said disc record hovers on a rotation-induced air cushion above a stationary support, said video disc player including a pickup assembly having a pickup stylus engageable in the spiral groove on said disc record to reproduce video information recorded therein during rotation of said disc record, said grinding device comprising:

a rotary grinding disc for grinding said pickup stylus;

means for controlling rotation of said rotary grinding disc;

means for transferring said pickup assembly from a first position where said pickup stylus is situated above said disc record, to a second position where said pickup stylus is positioned above said rotary grinding disc, said transferrence being carried out while said pickup stylus is separated from said disc record;

means for engaging said pickup stylus to said rotary grinding disc, when said pickup assembly is in said second position, whereby causing said rotary grinding disc to contact against said pickup stylus under a predetermined contact pressure; and means for varying a grinding condition to be subjected to said pickup stylus, which has been engaged to said rotary grinding disc, when the duration of actual service of said pickup stylus attains a predetermined value.

2. A stylus grinding device as claimed in claim 1, wherein said varying means comprises means for converting said druation of actual service of said pickup stylus into an electrical potential and storing said electrical potential indicative of said duration of actual service of said pickup stylus, and means for controlling a time during which said pickup stylus is ground by said rotary grinding disc, in accordance with said electrical potential stored on said converting and storing means.

3. A stylus grinding device as calimed in claim 1, wherein said varying means comprises means for converting said duration of actual service of said pickup stylus into an electrical potential and storing said electrical potential indicative of said duration of actual service of said pickup stylus, and means for controlling the number of rotation of said rotary grinding disc.

4. A stylus grinding device as claimed in claim 1, wherein said rotary grinding disc has one surface formed with a plurality of substantially concentric grinding grooves into which said pickup stylus is selectively engageable during the grinding operation and wherein said varying means comprises means for selectively positioning said pickup stylus relative to any of said grinding grooves in the order from the innermost grinding groove towards the outermost grinding groove in accordance with increase of said duration of actual service of said pickup stylus.

5. A stylus grinding device for use in a video disc player utilizing a flexible foil-type disc record adapted to be rotated at its center at a high speed while said disc record hovers on a rotation-induced air cushion above a stationary support, said video disc player including a pickup assembly having a pickup stylus engageable in the spiral groove on said disc record to reproduce video information recorded therein during rotation of said disc record, said grinding device comprising:

a rotary grinding disc for grinding said pickup stylus;

means for controlling rotation of said rotary grinding disc;

means for transferring said pickup assembly from a first position where said pickup stylus is situated above said disc record, to a second position where said pickup stylus is positioned above said rotary grinding disc, said transference being carried out while said pickup stylus is separated from said disc record;

means for moving said rotary grinding disc, when said pickup assembly is in said second position, in a direction towards said pickup stylus thereby causing said rotary grinding disc to contact against said pickup stylus;

means for increasing the contact pressure between said pickup stylus and said grinding disc, after the contact therebetween has been achieved by said moving means, in accordance with the duration of actual service of said pickup stylus.

6. A stylus grinding device as claimed in claim 5, wherein said rotary grinding disc has one surface formed with a plurality of substantially concentric grinding grooves into which said pickup stylus is selectively engageable during the grinding operation, said one surface is upwardly inclined in the radially outward direction thereof so that the thickness of said grinding disc increased from a portion adjacent the center thereof towards the outer peiphery thereof, and wherein said increasing means comprises means for stepwisely displacing said second position of said pickup assembly in a radial direction of said rotary grinding disc in accordance with increase of the duration of actual service of said pickup stylus.

* * * * *

UNITED STATES PATENT OFFICE
CERTIFICATE OF CORRECTION

Patent No. 3,973,361            Dated August 10, 1976

Inventor(s) MASARU YAMANO ET AL

It is certified that error appears in the above-identified patent and that said Letters Patent are hereby corrected as shown below:

Col. 1, line 40, correct "aare" to --are--;

Col. 1, line 47, correct "a portion 1" to --a portion 1a--;

Col. 12, line 38, correct "deive" to --drive--;

Col. 14, line 23, correct "os" to --of--; and

Col. 16, line 47, correct "peiphery" to --periphery--.

Signed and Sealed this

Thirtieth Day of November 1976

[SEAL]

Attest:

RUTH C. MASON
Attesting Officer

C. MARSHALL DANN
Commissioner of Patents and Trademarks